(12) United States Patent  (10) Patent No.: US 9,140,591 B2
Adlon  (45) Date of Patent: Sep. 22, 2015

(54) FLUID FLOW SENSOR FOR USE IN A HYDRATION MONITORING SYSTEM

(71) Applicant: ATP, Inc., Hummelstown, PA (US)

(72) Inventor: Daniel Todd Adlon, Harrisburg, PA (US)

(73) Assignee: ATP, Inc., Hummelstown, PA (US)

( * ) Notice: Subject to any disclaimer, the term of this patent is extended or adjusted under 35 U.S.C. 154(b) by 216 days.

(21) Appl. No.: 14/015,242

(22) Filed: Aug. 30, 2013

(65) Prior Publication Data

US 2015/0059466 A1    Mar. 5, 2015

(51) Int. Cl.
*G01F 1/05*  (2006.01)
*G01F 1/10*  (2006.01)
*G01F 1/115*  (2006.01)
*G01F 15/075*  (2006.01)
*A47G 23/16*  (2006.01)

(52) U.S. Cl.
CPC  *G01F 1/10* (2013.01); *A47G 23/16* (2013.01); *G01F 1/115* (2013.01); *G01F 15/0755* (2013.01)

(58) Field of Classification Search
None
See application file for complete search history.

(56) References Cited

U.S. PATENT DOCUMENTS

2006/0270971 A1* 11/2006 Gelfand et al. ................. 604/66
2014/0311239 A1* 10/2014 Marjanovic et al. ............ 73/296

* cited by examiner

*Primary Examiner* — Andre Allen
(74) *Attorney, Agent, or Firm* — Duane Morris LLP

(57) ABSTRACT

A hydration monitoring device and system for recording and controlling an individual's hydration includes an improved fluid flow sensor configured to measure a quantity of fluid transferring from a reservoir to a user in a first fluid flow direction only.

21 Claims, 8 Drawing Sheets

FLUID FLOW SENSOR FOR USE IN A HYDRATION MONITORING SYSTEM

FIELD OF THE INVENTION

The present invention generally relates to hydration systems and, more particularly, to apparatus for monitoring the consumption of fluid where the fluid monitoring unit employs an improved impeller that reduces or eliminates "false" fluid consumption readings caused by fluid back flow during hydration sessions.

BACKGROUND OF THE INVENTION

Accurate monitoring of personal fluid consumption is vital for health. A variety of physiological and medical problems can arise with inappropriate fluid intake. For example, dehydration may increase the risk of cardiovascular strain, reduce heat tolerance, and reduce physical exercise performance. In addition, overhydrating may result in hyponatremia (low blood sodium levels) or other medical problems in some patient groups.

Quantifying the pattern and amount of fluid consumed over time by an individual is often fraught with inaccuracies. One approach is to ask individuals to only drink from a given personal container, to keep track of the fluid consumed from that container, and to carefully record the date, time, and amount of liquid consumed. The volume consumed is determined by reading the liquid level from graduations on a fluid container before and after drinking, and then calculating the difference. This approach is difficult under low-light conditions, and incorrect logbook entries are common. Inaccurate or inconsistent measurements often occur with prior art hydration devices, particularly at very low flow rates. At low flow rates, similar to rates produced by small sips, the amount of fluid consumed is often insufficient to fully engage a measurement sensor.

In U.S. Pat. No. 6,212,959, issued to Perkins, and incorporated herein by reference, a system for insuring proper human hydration is disclosed that includes an oral-suction-activated flow meter which measures and displays the volume of fluid withdrawn from a reservoir. Perkins suggests that a check valve, to prevent return flow of fluid from the user's mouth to the reservoir, is often adequate. In particular, Perkins' check valve is suggested as only allowing the flow of fluid in one direction. In use, the fluid flows from a bladder or fluid container, through the check valve and a fluid monitoring unit, and to the user through an outlet tube and mouthpiece. The check valve is meant to prevent the flow of fluid in the opposite direction, i.e., from the fluid monitoring unit back through the check valve. However, in practice, this arrangement appears to trap fluid in the top of the outlet tube (straw or mouthpiece) and requires a bite valve to prevent spillage. This bite valve may be problematic for elderly users or those with oral conditions that impair the user's ability to bite with sufficient force to actuate the bite valve.

In many prior art hydration devices, even if a one-way check valve is placed above the metering device and functions appropriately, there will still be a volume of liquid located within the flow measuring device, but below the check-valve, that will flow back toward its source and through the metering device actuating the metering device and generating erroneous fluid flow data. As a consequence, the check valve may allow fluid to flow in a reverse direction through the impeller thereby diminishing accuracy by allowing the impeller to rotate in an opposite direction.

SUMMARY OF THE INVENTION

The invention provides a fluid flow sensor configured to measure a quantity of fluid transferring from a reservoir to a user in a first fluid flow direction only. The fluid flow sensor includes a moveable impeller having angled vanes that project radially outwardly from an outer surface. A first spindle projects from a first end and a second spindle projects from a second end such that the first and second spindles are arranged in coaxial relation to a longitudinal axis of the impeller. A plurality of pawls are arranged at an end of the impeller in concentric relation to the second spindle. A magnet is mounted in the impeller so as to be parallel to a longitudinal axis of first and second spindles and a counting coil mounted in spaced relation to the magnet. A first journal having a through-bore arranged to coaxially receive the first spindle such that the first spindle may (i) rotate within the first journal, and (ii) translate longitudinally with respect to the first journal. A second journal having a through-bore arranged to coaxially receive the second spindle such that the second spindle may (i) rotate within the second journal, and (ii) translate longitudinally with respect to the second journal. A plurality of teeth are arranged on the journal in concentric relation to the through-bore so that the impeller is free to rotate when the plurality of teeth are disengaged from the plurality of pawls, and stopped from rotating when the plurality of teeth are engaged by the plurality of pawls.

In another embodiment, a hydration monitoring device for recording and controlling an individual's hydration is provided that includes a fluid reservoir for holding a quantity of fluid. The reservoir includes a tube for transferring fluid from the reservoir via a passage to a fluid flow sensor such that the cumulative quantity of fluid imbibed by the user is measured and recorded. The fluid flow sensor includes a moveable impeller having angled vanes that project radially outwardly from an outer surface. A first spindle projects from a first end and a second spindle projects from a second end. The first and second spindles are arranged in coaxial relation to a longitudinal axis of the impeller with a plurality of pawls arranged at an end of the impeller in concentric relation to the second spindle. A magnet is mounted in the impeller so as to be parallel to a longitudinal axis of first and second spindles and a counting coil mounted in spaced relation to the magnet. A first journal includes a through-bore arranged to coaxially receive the first spindle such that the first spindle may (i) rotate within the first journal, and (ii) translate longitudinally with respect to the first journal. A second journal includes a through-bore arranged to coaxially receive the second spindle such that the second spindle may (i) rotate within the second journal, and (ii) translate longitudinally with respect to the second journal. A plurality of teeth are arranged on the journal in concentric relation to the through-bore. In this way, the impeller is free to rotate when in a first state such that the plurality of teeth are disengaged from the plurality of pawls, and stopped from rotating when in a second state such that the plurality of teeth are engaged by the plurality of pawls.

In a further embodiment, a hydration monitoring system for recording and controlling an individual's hydration is provided that includes a bottle for holding a quantity of fluid including a tube for transferring fluid from the bottle to a fluid flow sensor so that the cumulative quantity of fluid imbibed by the user is measured and recorded. A fluid flow sensor is provided having a moveable impeller including at least four vanes that project radially outwardly from an outer surface. A first spindle projects from a first end and a second spindle projects from a second end. The first and second spindles are arranged in coaxial relation to a longitudinal axis of the impeller with a plurality of ramps arranged at an end of the impeller in concentric relation to the second spindle. A magnet is mounted in the impeller so as to be parallel to a longitudinal axis of first and second spindles and a counting coil mounted in spaced relation to the magnet. A first journal having a through-bore is arranged to coaxially receive the first spindle such that the first spindle may (i) rotate within the first journal, and (ii) translate longitudinally with respect to the first journal. A second journal also includes a through-bore that is arranged to coaxially receive the second spindle such that the second spindle may (i) rotate within the second journal, and (ii) translate longitudinally with respect to the second journal. A plurality of ramps are arranged on the second journal in concentric relation to the through-bore so that the impeller is free to rotate when in a first state such that plurality of ramps are disengaged, and stopped from rotating when in a second state wherein the plurality of ramps are engaged with one another.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF THE PREFERRED EMBODIMENT

Figure 1:
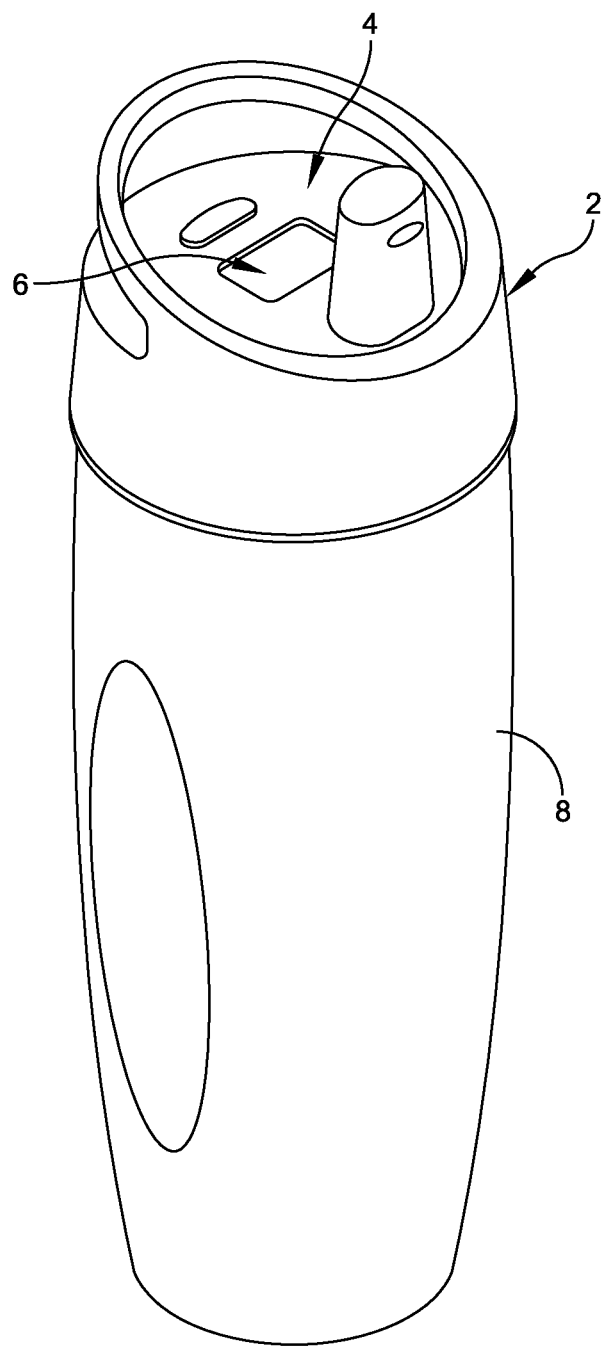
FIG. 1 is a perspective view of a hydration monitoring system including an improved fluid flow sensor in accordance with one embodiment of the invention.
Figure 2:
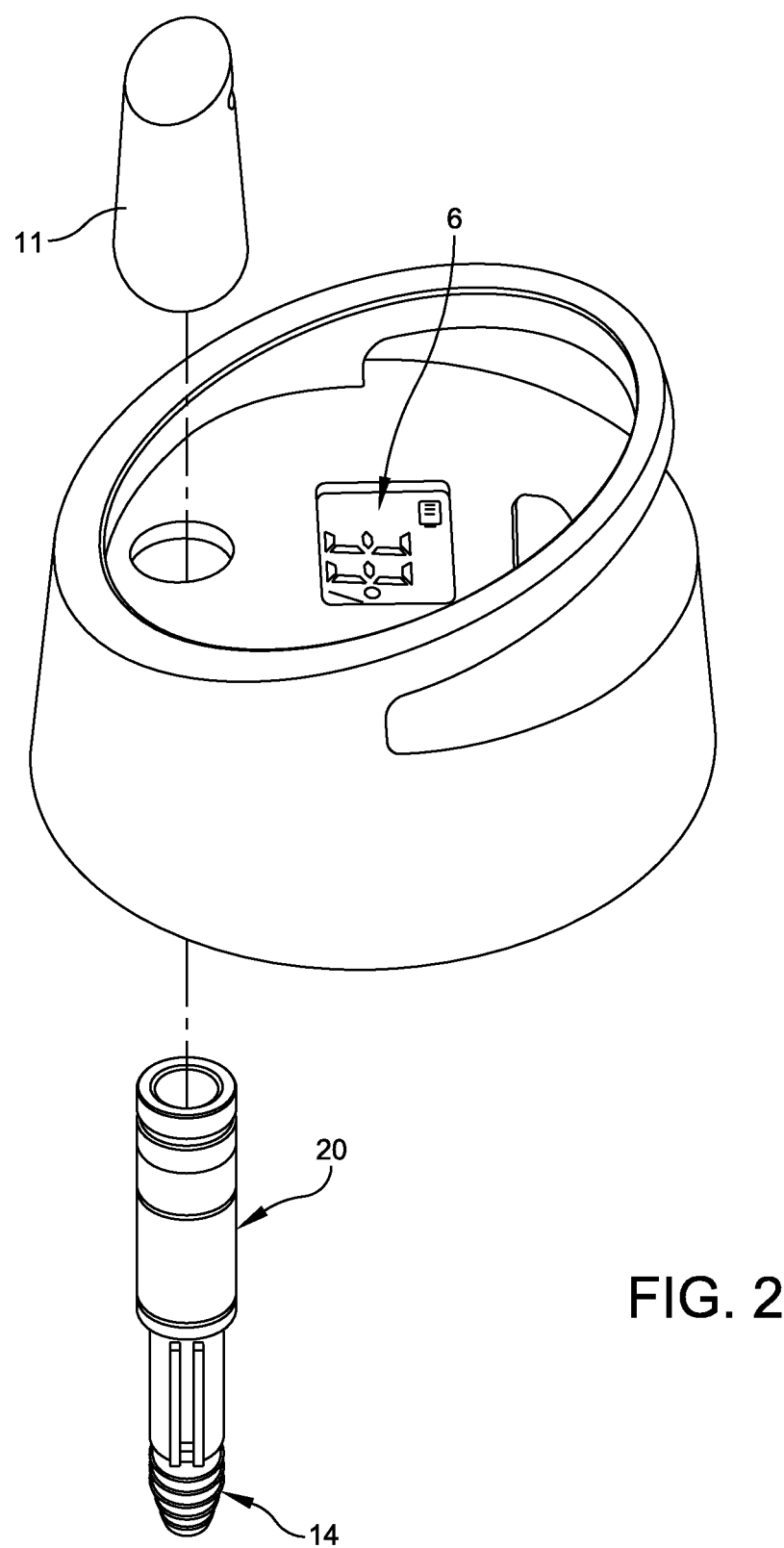
FIG. 2 is an exploded perspective view of the cap of the hydration system shown in FIG. 1.
Figure 3:
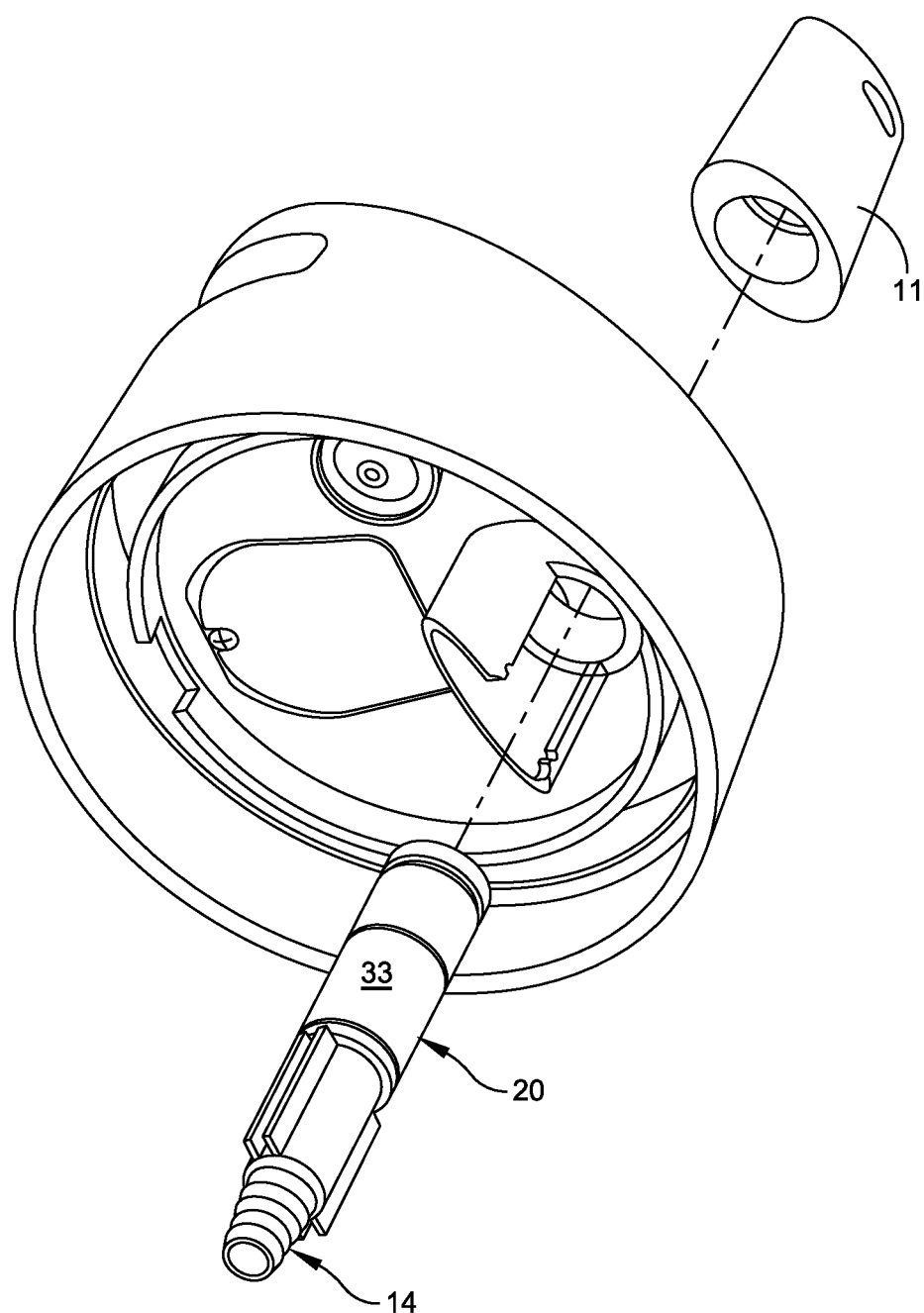
FIG. 3 is an exploded perspective view of an under portion of the cap shown in FIGS. 1 and 2.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. When only a single machine is illustrated, the term "machine" shall also be taken to include any collection of machines that individually or jointly execute a set (or multiple sets) of instructions to perform any one or more of the methodologies discussed herein. In the claims, means-plus-function clauses, if used, are intended to cover the structures described, suggested, or rendered obvious by the written description or drawings for performing the recited function, including not only structural equivalents but also equivalent structures. It is noted that references in the specification to "one embodiment", "an embodiment", "an alternative embodiment", etc., mean that the structures or procedures being described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one of ordinary skill in the art would possess the knowledge to effect such feature, structure, or characteristic in connection with other embodiments whether or not explicitly described.

Referring to FIGS. 1-3 and 7, an improved flow meter-based hydration system 2 of one embodiment of the invention includes a suction-activated flow meter 4, an indicator 6, and a water or liquid reservoir 8. A tube 10 (FIG. 7) interconnects reservoir 8 with suction-activated flow meter 4 and the user. In operation, suction is applied to a mouthpiece 11 by a user. Mouthpiece 11 communicates with tube 10 via suction-activated flow meter 4. Located within suction-activated flow meter 4 is a flow metering device or transducer 20, often in the form of a positive-displacement-type flow meter. Fluid from reservoir 8, often a container such as a bottle or bladder (FIG. 1), enters fitting 14 at the input of suction-activated flow meter 4 and indicator 6 and flows to metering device 20 through an entrance tube 10c. From there, the fluid flows through an exit tube 12 into mouthpiece 11 and the user's mouth. In some embodiments, a one-way check valve 23 is located in exit tube 12 so as to permit the flow of the fluid in one direction only while preventing return flow of fluid toward reservoir 8.

Figure 4:
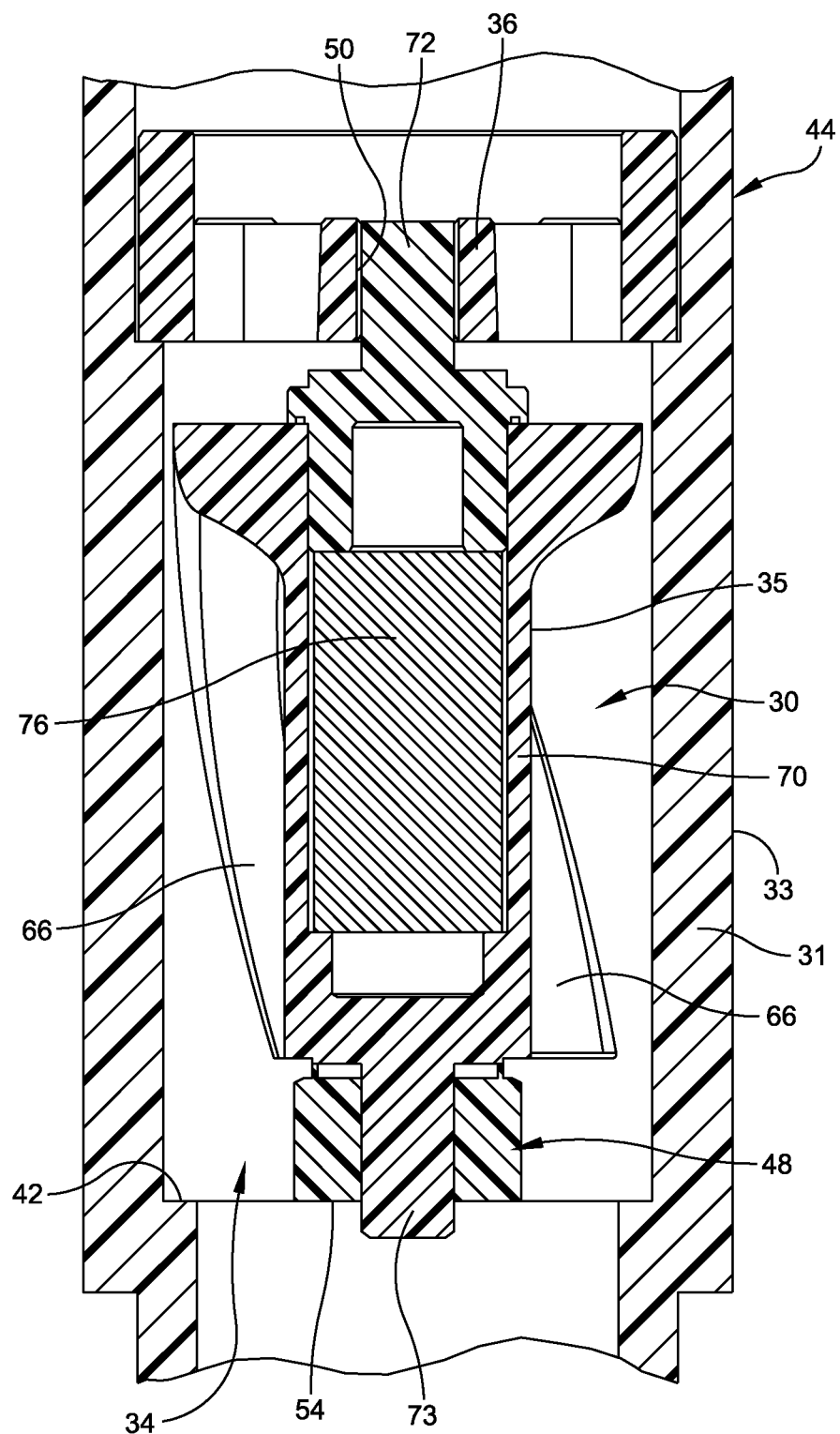
FIG. 4 is a cross-sectional plan view of an impeller assembly formed in accordance with one embodiment of the invention.
Figure 5:
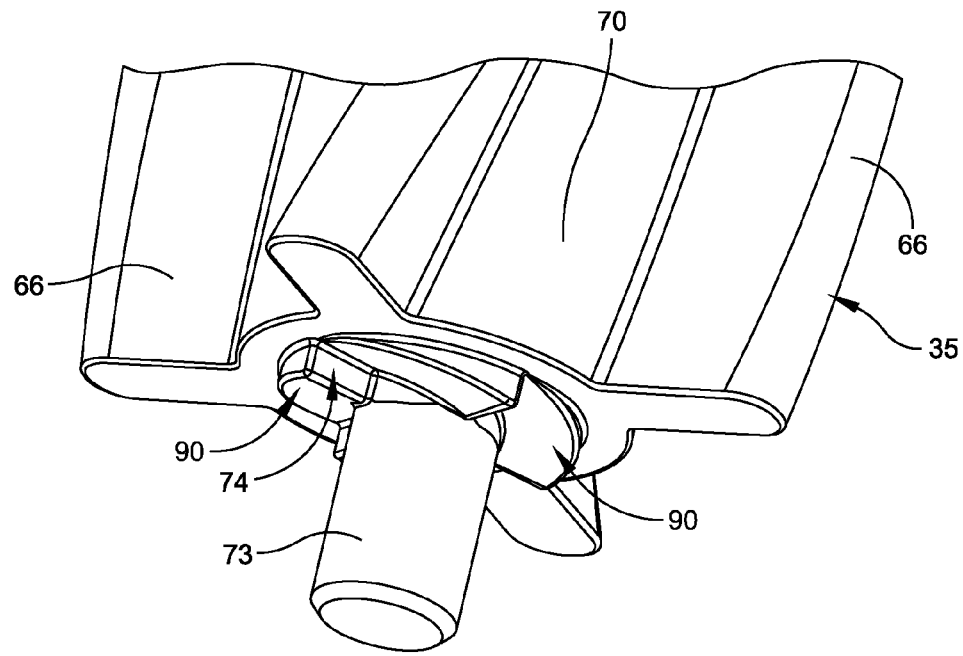
FIG. 5 is a broken-away, perspective view of a lower portion of an impeller.
Figure 6:
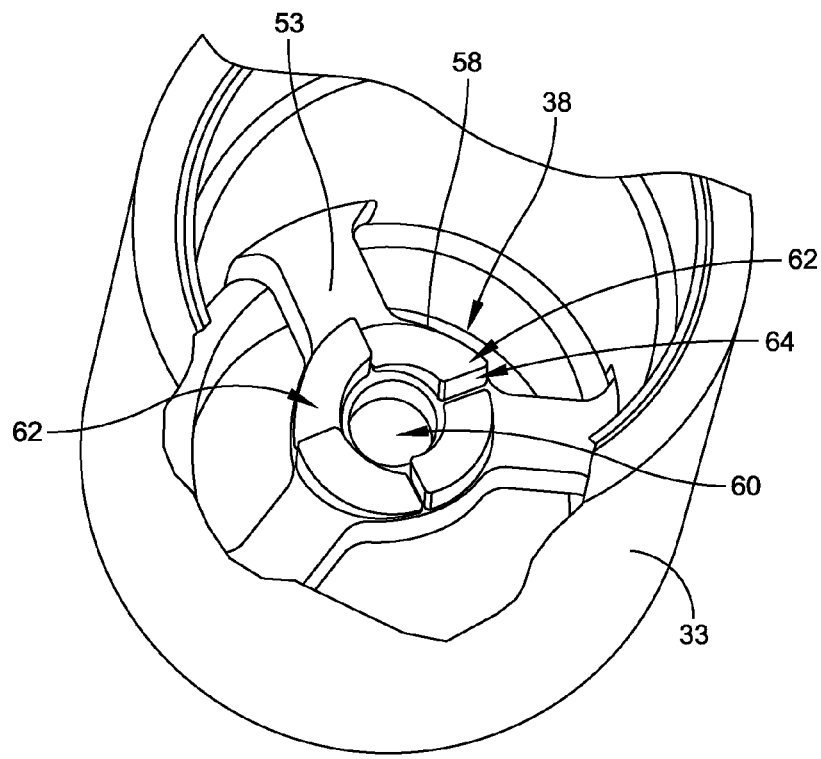
FIG. 6 is a broken-away, perspective view of a portion of the cylinder housing showing one bearing hub.

The present invention incorporates an improved flow metering device 20 that includes an impeller assembly 30 (FIGS. 4-7) having a cylindrical housing 31 and an impeller 35. Cylindrical housing 31 includes a cylindrical outer wall 33 that defines an internal cylindrical cavity 34, a top journal 36, and a bottom journal 38 (FIG. 4). Top journal 36 is disposed adjacent to mouthpiece 11, above impeller 35, and defines a central through bore 50. Bottom journal 38 is located in a lower portion of cylindrical housing 31 (FIGS. 5 and 6). A plurality of circumferentially spaced struts 53 project radially inwardly from the inner surface of cylindrical outer wall 33. Struts 53 join at their ends to form a bearing-hub 58 that defines a central through-bore 60. Advantageously, bearing-hub 58 includes a plurality of ramped teeth 62 arranged in concentric relation to central through-bore 60 and within cylindrical cavity 34. Each ramped tooth 62 defines a stop wall 64.

Referring to FIGS. 4 and 5, impeller 35 is often cylindrically shaped, and includes at least two angled vanes or blades 66, and often as many as four, that project radially outwardly from a central axle 70. Axle 70 may be formed as a solid cylinder having a top spindle 72 and a bottom spindle 73. Spindles 72 and 73 project from axle 70 in concentric relation to the longitudinal axis of axle 70. Vanes 66 project radially outwardly from the side surface of axle 70 so that as axle 70 rotates so do vanes 66. A diametrically magnetized magnet 76 is mounted in an axial bore in axle 70, so as to be coaxial with the longitudinal axis of spindles 72 and 73, with north and south poles along the axis of the magnet. A coil 78 (FIG. 7) is mounted on the outside of housing 31, in proximity with metering device 20. The orientation of magnet 76 can also be reversed, if need be, with the only effect being a reversal of the polarity of the pulse created in coil 78. Either polarity can be counted by a microprocessor 80 (FIG. 7) as would be known to those skilled in the art. Advantageously, at the bottom end of axle 70, surrounding bottom spindle 73, a plurality of pawl ramps 90 are arranged in concentric relation to axle 70 and bottom spindle 73. Each pawl ramp defines a stop face 74, and is located around spindle 73 in complementary relation to plurality of ramped teeth 62 arranged in concentric relation to central through-bore 60 of second hub 58.

Thus, impeller 35 is free to rotate within housing 31 while otherwise positionally constrained by spindles 72 and 73 located within journals 36 and 38. Advantageously, the length of axle 70, along its longitudinal axis, is less than the distance between respective journals 36 and 38, while the distance between spindles 72 and 73 is greater than the distance between journals 36 and 38. As a result, spindles 72 and 73, which project outwardly from opposite ends of axle 70, may be freely received within through-bores 50 and 60 in their respective journals 36, 38, so that axle 70 may shift longitudinally so as to engage only one journal, i.e., bottom journal 38 of bearing-hub 58, in the absence of fluid flow and top journal 36 when experiencing under fluid flowing toward mouthpiece 11. In other words, there is "longitudinal play" in the relationship between impeller 35 and bearing journals 36, 38 such that spindles 72 and 73 may both rotate about the longitudinal axis of axle 70 and translate longitudinally within through-bores 50 and 60 so as to alter the position of impeller 35 within housing 31 in the longitudinal direction in response to fluid flowing through the system. The diameter of impeller assembly 30 is preferably about one centimeter (0.5 in). Housing 31 is preferably made of a durable polymer material, such as polycarbonate. Alternatively, it could be made of a non-ferrous, i.e., non-magnetic metal, such as aluminum. Axle 70 and vanes 66 are preferably made of polyoxymethylene or another rigid engineering polymer materials.

Figure 7:
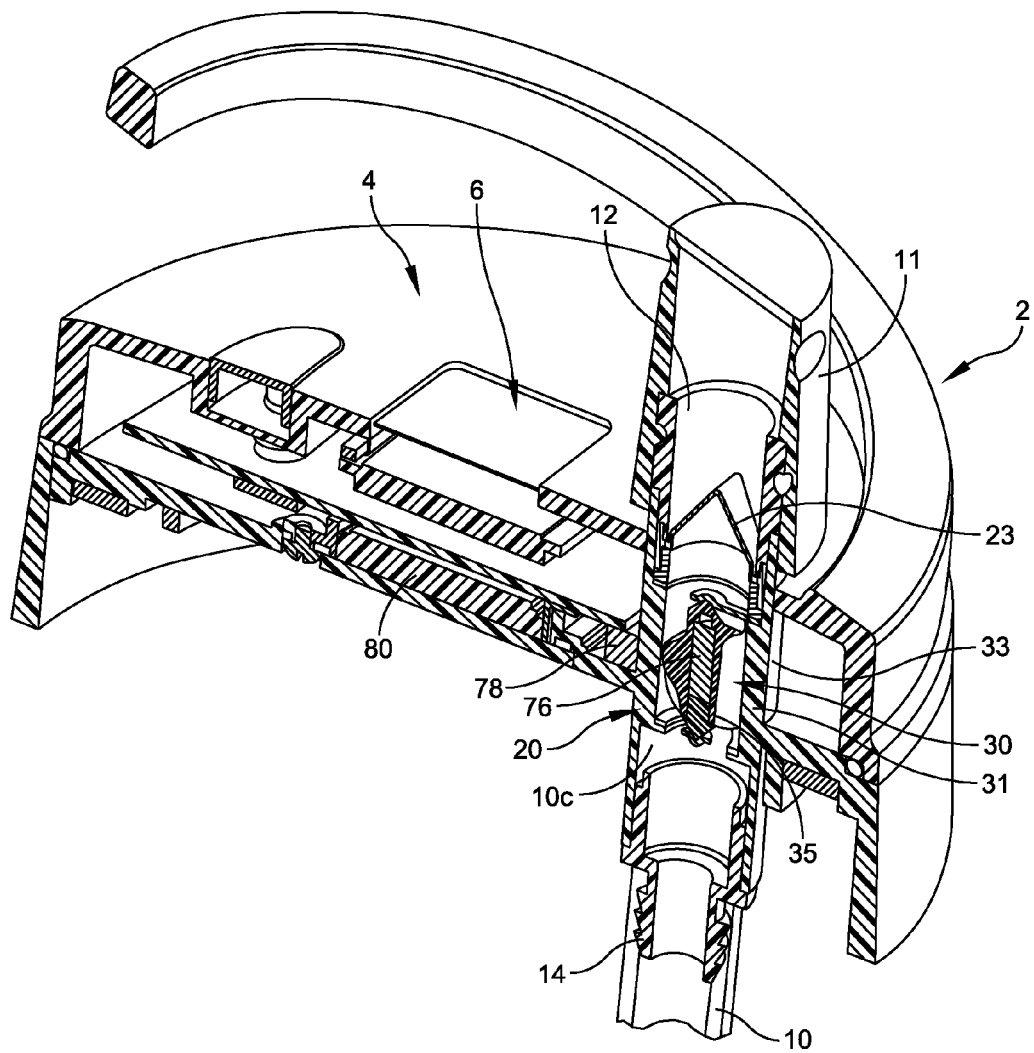
FIG. 7 is a cross-sectional perspective view of the cap shown in FIGS. 1, 2, and 3.

Improved flow meter-based hydration system 2 operates in response to suction being applied to a mouthpiece 11 by a user, such that fluid flows through fitting 14 and metering device 20. The user applied suction causes fluid to rise through entrance tube 10c and through housing 31 of impeller assembly 30. As this occurs, the fluid impinging upon angled vanes 66 causes impeller 35 to rotate. As impeller 35 rotates, magnet 76 creates a periodically changing magnetic field near the outside surface of housing 31. The rate of rotation of impeller 35 is determined by the rate of flow of fluid. The number of rotations of impeller 35 is thus proportional to the volume of fluid which flows through housing 31. Magnetic field lines from magnet 76 extend outside housing 31 in known fashion. At any given location on housing 31, the magnetic field varies in strength as impeller 35 rotates within journals 36, 38 and magnet 76 approaches then retreats from that location. These variations are detected by coil 78, located in operative proximity to housing 31. As magnet 76 moves in the vicinity of coil 78, a current is induced in coil 78 in well-known fashion. Coil 78 is coupled to a microprocessor 80 associated with indicator 6 (FIG. 7). Thus, with one magnet 76 in axle 70 of impeller 33, each rotation of impeller 35, the sensor assembly will see one rise and one fall in magnetic field strength. The output of coil 78 thus experiences one positive-going pulse and one negative-going pulse with each rotation of impeller 35.

Figure 8:
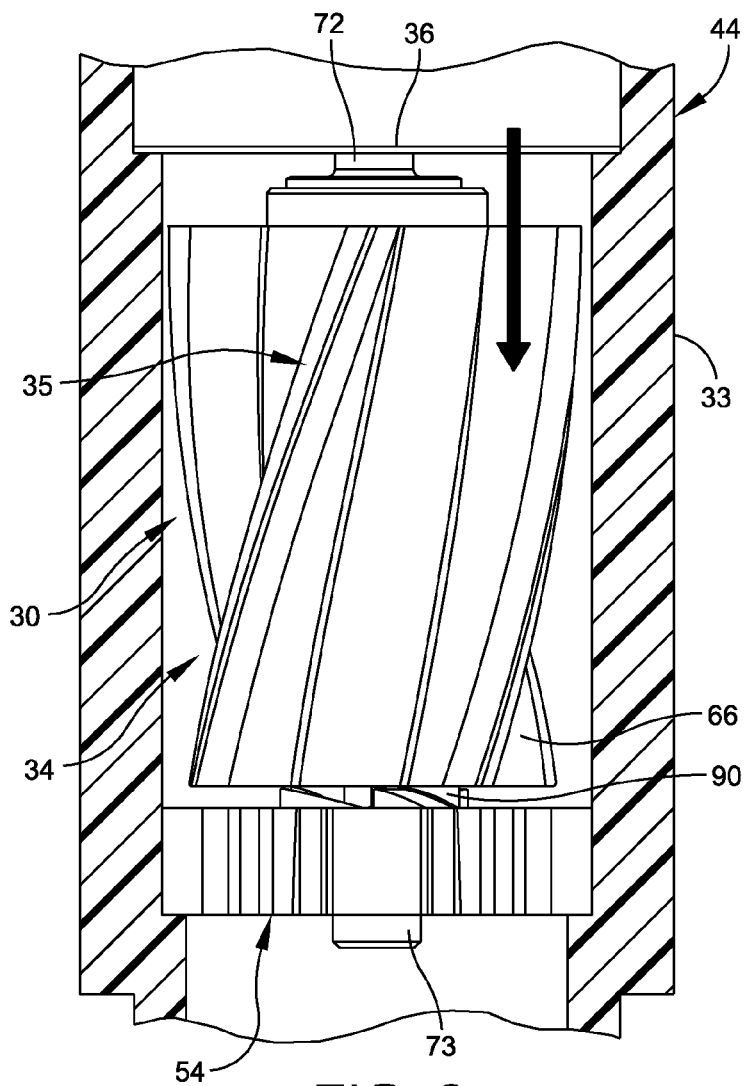
FIG. 8 is a partially perspective, partially cross-sectional view of an impeller assembly formed in accordance with one embodiment of the invention showing the impeller locked and resisting reversed flow rotation, and including an arrow to indicate the general direction of fluid flowing through the assembly.
Figure 9:
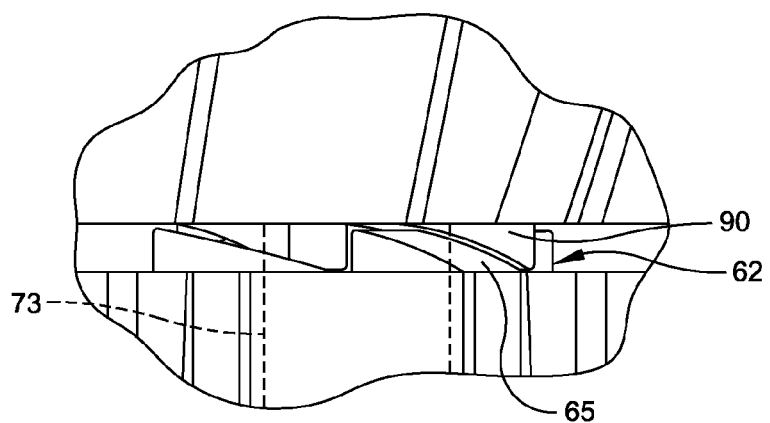
FIG. 9 is a broken-away, perspective view of a lower portion of the impeller assembly shown in FIG. 8, illustrating the engagement of the pawl ramps located on the lower portion of the impeller with ramped teeth complementarily located on a bearing-hub.
Figure 10:
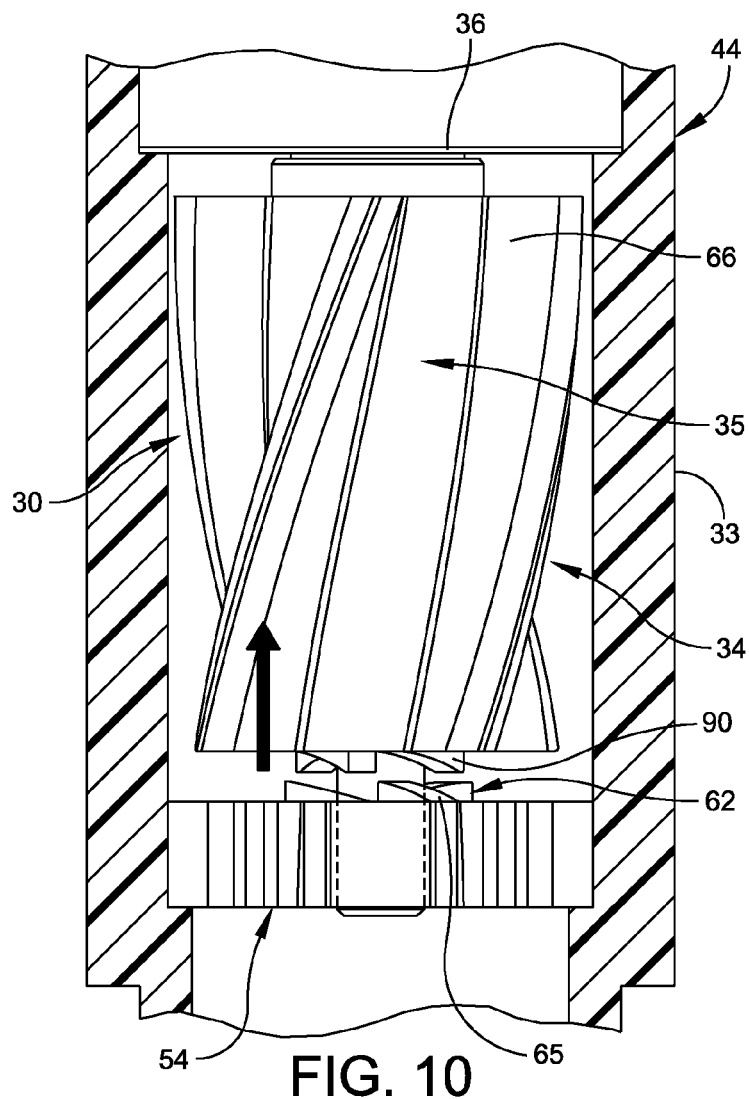
FIG. 10 is a partially perspective, partially cross-sectional view of the impeller assembly shown in FIG. 8, but showing the impeller unlocked and allowing free flow rotation, and including an arrow to indicate the general direction of fluid flowing through the assembly.
Figure 11:
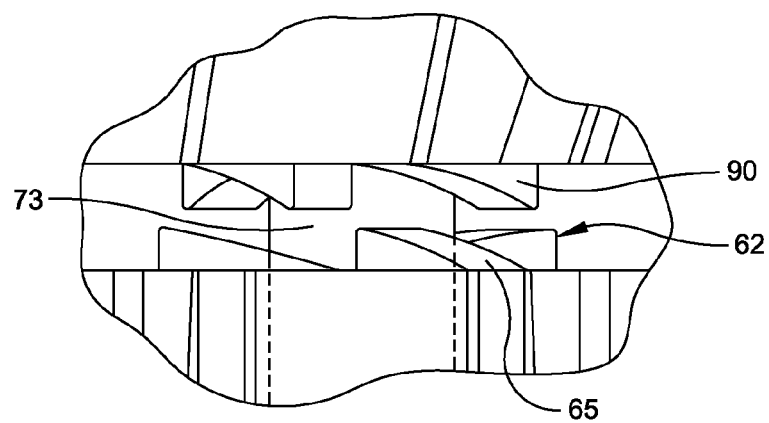
FIG. 11 is a broken-away, perspective view of the lower portion of the impeller assembly shown in FIGS. 8-10, illustrating the disengagement of the pawl ramps located on the lower portion of the impeller from the ramped teeth complementarily located on a bearing-hub so as to allow free forward flow rotation of the impeller.

Advantageously, upon the application of suction by a user (fluid movement being indicated by the arrow in FIG. 10) the longitudinal play in impeller assembly 30, i.e., the free longitudinal movement within through-bores 50 and 60 of spindles 72 and 73, causes each face 74 of plurality of pawl ramps 90 that are arranged in concentric relation to bottom spindle 73 to disengage complementary located faces 64 of plurality of ramped teeth 62 arranged in concentric relation to central through-bore 60 of second bearing-hub 58. As teeth 62 disengage from pawl ramps 90, impeller 35 is free to rotate and thereby provide a rate of flow of fluid according to the method described herein above (FIG. 10). However, when suction is removed, i.e., when the user stops drawing fluid from mouthpiece 11 (fluid movement being indicated by the arrow FIG. 8) spindles 72, 73 are free to move longitudinally within journals 36 and 38 so as to allow teeth 62 re-engage pawl ramps 90 and thereby prevent further rotation of impeller 35. In this way, the movement of residual fluid back through housing 31 will not cause impeller 35 to rotate and thereby avoid the generation of false fluid delivery signals.

It is to be understood that the invention is by no means limited only to the particular constructions herein disclosed and shown in the drawings, but also comprises any modifications or equivalents within the scope of the claims.

What is claimed is:

1. A fluid flow sensor configured to measure a quantity of fluid transferring from a reservoir to a user in a first fluid flow direction only, said fluid flow sensor comprising:
   a moveable impeller including angled vanes that project radially outwardly from an outer surface, a first spindle projecting from a first end and a second spindle projecting from a second end wherein said first and second spindles are arranged in coaxial relation to a longitudinal axis of said impeller with a plurality of pawls arranged at an end of said impeller in concentric relation to said second spindle;

a magnet mounted in said impeller so as to be parallel to a longitudinal axis of first and second spindles and a counting coil mounted in spaced relation to said magnet;

a first journal defining a through-bore arranged to coaxially receive said first spindle such that said first spindle may (i) rotate within said first journal, and (ii) translate longitudinally with respect to said first journal; and a second journal defining a through-bore arranged to coaxially receive said second spindle such that said second spindle may (i) rotate within said second journal, and (ii) translate longitudinally with respect to said second journal, and including a plurality of teeth arranged on said journal in concentric relation to said through-bore so that said impeller is free to rotate when in a first state wherein said plurality of teeth are disengaged from said plurality of pawls, and stopped from rotating when in a second state wherein said plurality of teeth are engaged by said plurality of pawls.

2. A fluid flow sensor according to claim 1 wherein said impeller is received within a cylindrical housing that defines an internal cavity and said second journal wherein a plurality of circumferentially spaced struts project radially inwardly from an inner surface of said cylindrical housing so as to join at their ends to form a bearing-hub that defines said second journal and said through-bore.

3. A fluid flow sensor according to claim 2 wherein said bearing-hub includes said plurality of teeth arranged in concentric relation to a centrally located through-bore, and wherein each tooth defines a stop wall.

4. A fluid flow sensor according to claim 1 wherein said impeller is cylindrically shaped, and includes at least two angled vanes.

5. A fluid flow sensor according to claim 3 wherein said plurality of pawls each define a ramp having a stop wall located in in complementary relation to said stop walls of said teeth.

6. A fluid flow sensor according to claim 2 wherein said impeller is positionally constrained by said spindles and the length of said impeller, along a longitudinal axis is less than the distance between said first and second journals.

7. A fluid flow sensor according to claim 6 wherein said spindles both rotate about a longitudinal axis of said impeller and translate longitudinally within said through-bores so as to alter the longitudinal position of said impeller within said housing in a longitudinal direction in response to fluid flowing through said housing.

8. A hydration monitoring device for recording and controlling an individual's hydration comprising:

a fluid reservoir for holding a quantity of fluid said reservoir including a first tube for transferring fluid from said reservoir via a passage to a fluid flow sensor, such that the cumulative quantity of fluid imbibed by the user is measured and recorded; and said fluid flow sensor comprising:

a moveable impeller including angled vanes that project radially outwardly from an outer surface, a first spindle projecting from a first end and a second spindle projecting from a second end wherein said first and second spindles are arranged in coaxial relation to a longitudinal axis of said impeller with a plurality of pawls arranged at an end of said impeller in concentric relation to said second spindle;

a magnet mounted in said impeller so as to be parallel to a longitudinal axis of first and second spindles and a counting coil mounted in spaced relation to said magnet;

a first journal defining a through-bore arranged to coaxially receive said first spindle such that said first spindle may (i) rotate within said first journal, and (ii) translate longitudinally with respect to said first journal; and a second journal defining a through-bore arranged to coaxially receive said second spindle such that said second spindle may (i) rotate within said second journal, and (ii) translate longitudinally with respect to said second journal, and including a plurality of teeth arranged on said journal in concentric relation to said through-bore so that said impeller is free to rotate when in a first state wherein said plurality of teeth are disengaged from said plurality of pawls, and stopped from rotating when in a second state wherein said plurality of teeth are engaged by said plurality of pawls.

9. A hydration monitoring device according to claim 8 wherein said impeller is received within a cylindrical housing that defines an internal cavity and said second journal wherein a plurality of circumferentially spaced struts project radially inwardly from an inner surface of said cylindrical housing so as to join at their ends to form a bearing-hub that defines said second journal and said through-bore.

10. A hydration monitoring device according to claim 9 wherein said bearing-hub includes said plurality of teeth arranged in concentric relation to a centrally located through-bore, and wherein each tooth defines a stop wall.

11. A hydration monitoring device according to claim 8 wherein said impeller is cylindrically shaped, and includes at least two angled vanes.

12. A hydration monitoring device according to claim 10 wherein said plurality of pawls each define a ramp having a stop wall located in in complementary relation to said stop walls of said teeth.

13. A hydration monitoring device according to claim 9 wherein said impeller is positionally constrained by said spindles and the length of said impeller, along a longitudinal axis is less than the distance between said first and second journals.

14. A hydration monitoring device according to claim 13 wherein said spindles both rotate about a longitudinal axis of said impeller and translate longitudinally within said through-bores so as to alter the longitudinal position of said impeller within said housing in a longitudinal direction in response to fluid flowing through said housing.

15. A hydration monitoring system for recording and controlling an individual's hydration comprising:

a bottle for holding a quantity of fluid including a tube for transferring fluid from said bottle to a fluid flow sensor so that the cumulative quantity of fluid imbibed by the user is measured and recorded; and a fluid flow sensor comprising:

a moveable impeller including at least four vanes that project radially outwardly from an outer surface, a first spindle projecting from a first end and a second spindle projecting from a second end wherein said first and second spindles are arranged in coaxial relation to a longitudinal axis of said impeller with a plurality of ramps arranged at an end of said impeller in concentric relation to said second spindle;

a magnet mounted in said impeller so as to be parallel to a longitudinal axis of first and second spindles and a counting coil mounted in spaced relation to said magnet;

a first journal defining a through-bore arranged to coaxially receive said first spindle such that said first spindle may (i) rotate within said first journal, and (ii) translate longitudinally with respect to said first journal; and a second journal defining a through-bore arranged to coaxially receive said second spindle such that said second spindle may (i) rotate within said second journal, and (ii) translate longitudinally with respect to said second journal, and including a plurality of ramps arranged on said journal in concentric relation to said through-bore so that said impeller is free to rotate when in a first state wherein said plurality of ramps are disengaged, and stopped from rotating when in a second state wherein said plurality of ramps are engaged with one another.

16. A hydration monitoring system according to claim 15 wherein said impeller is received within a cylindrical housing that defines an internal cavity and said second journal wherein a plurality of circumferentially spaced struts project radially inwardly from an inner surface of said cylindrical housing so as to join at their ends to form a bearing-hub that defines said second journal and said through-bore.

17. A hydration monitoring system according to claim 16 wherein said bearing-hub includes said plurality of teeth arranged in concentric relation to a centrally located through-bore, and wherein each tooth defines a stop wall.

18. A hydration monitoring system according to claim 15 wherein said impeller is cylindrically shaped, and includes at least two angled vanes.

19. A hydration monitoring system according to claim 17 wherein said plurality of pawls each define a ramp having a stop wall located in in complementary relation to said stop walls of said teeth.

20. A hydration monitoring system according to claim 16 wherein said impeller is positionally constrained by said spindles and the length of said impeller, along a longitudinal axis is less than the distance between said first and second journals.

21. A hydration monitoring system according to claim 20 wherein said spindles both rotate about a longitudinal axis of said impeller and translate longitudinally within said through-bores so as to alter the longitudinal position of said impeller within said housing in a longitudinal direction in response to fluid flowing through said housing.

* * * * *